(No Model.) 5 Sheets—Sheet 2.

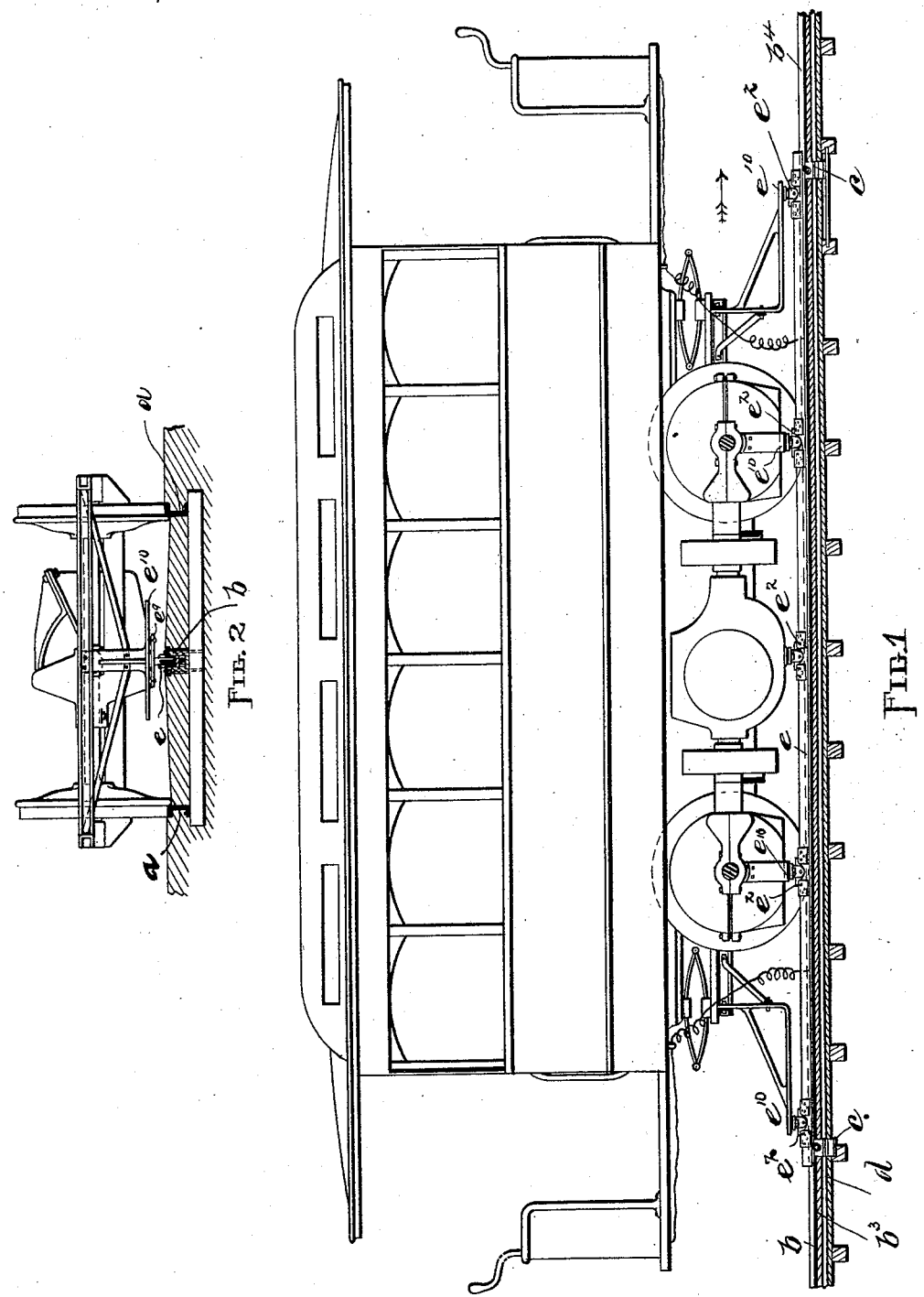

J. B. LINN.
CONDUIT SYSTEM FOR ELECTRIC RAILWAYS.

No. 528,330. Patented Oct. 30, 1894.

Witnesses.
E. Byron Gilchrist.
Albert Lamborn

Inventor.
John B. Linn
By Shepherd Shepherd
Attys.

(No Model.)

J. B. LINN.
CONDUIT SYSTEM FOR ELECTRIC RAILWAYS.

No. 528,330. Patented Oct. 30, 1894.

Witnesses,
E. Byron Gilchrist
Albert Lamborn

Inventor,
John B. Linn
By Stahy & Shepherd
Attys (No Model.) 5 Sheets—Sheet 4.
J. B. LINN.
CONDUIT SYSTEM FOR ELECTRIC RAILWAYS.
No. 528,330. Patented Oct. 30, 1894.
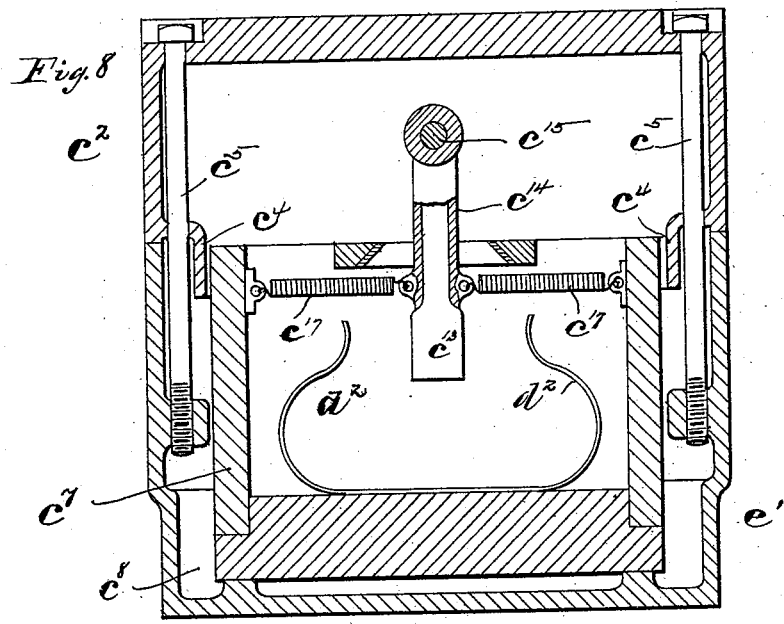
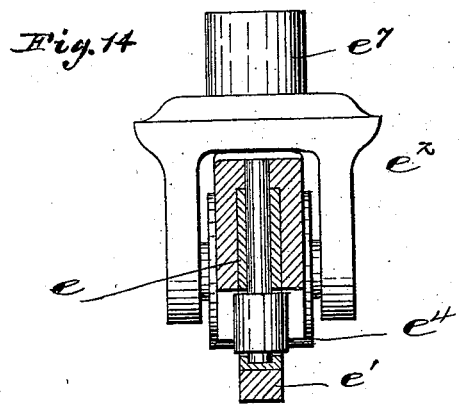
WITNESSES:
Albert Lamborn
Chas. J. Welch
INVENTOR
John B. Linn
BY
ATTORNEYS (No Model.) 5 Sheets—Sheet 5.

J. B. LINN.
CONDUIT SYSTEM FOR ELECTRIC RAILWAYS.

No. 528,330. Patented Oct. 30, 1894.

WITNESSES:
F. A. Cutter.
Albert Lamborn.

INVENTOR:
John B. Linn

UNITED STATES PATENT OFFICE.

JOHN B. LINN, OF CLEVELAND, ASSIGNOR OF ONE-HALF TO OLIVER S. KELLY, OF SPRINGFIELD, OHIO.

CONDUIT SYSTEM FOR ELECTRIC RAILWAYS.

SPECIFICATION forming part of Letters Patent No. 528,330, dated October 30, 1894.

Application filed December 9, 1893. Serial No. 493,272. (No model.)

*To all whom it may concern:*

Be it known that I, JOHN B. LINN, a citizen of the United States, residing at Cleveland, in the county of Cuyahoga and State of Ohio, have invented certain new and useful Improvements in Systems for Operating Electric Cars, of which the following is a specification.

My invention relates to improvements in systems for operating electric cars, and the object of my invention is to provide a system for supplying an electric current to motor cars from a stationary source of supply; the system being of the nature of an underground system.

A further object of my invention is to provide novel means by which contacting devices are brought into circuit by contacting with the collector of the car; these contacting devices being arranged at suitable intervals and normally disconnected from the circuit which supplies the current. I attain these objects by the constructions shown in the accompanying drawings, in which—

Figure 3:
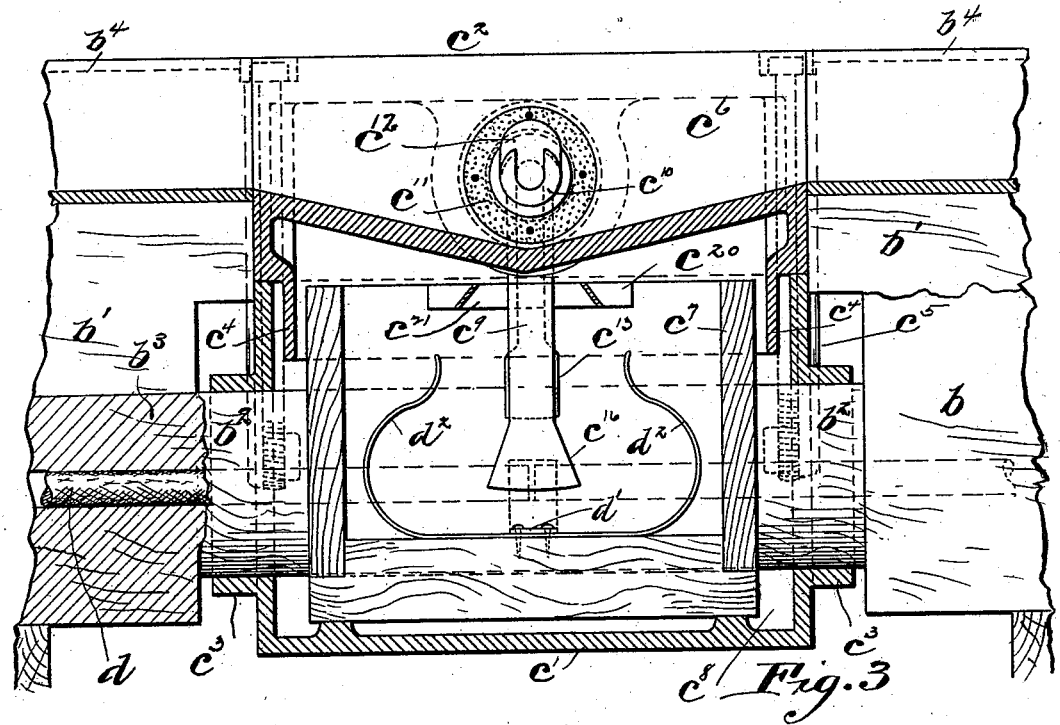
Figure 4:
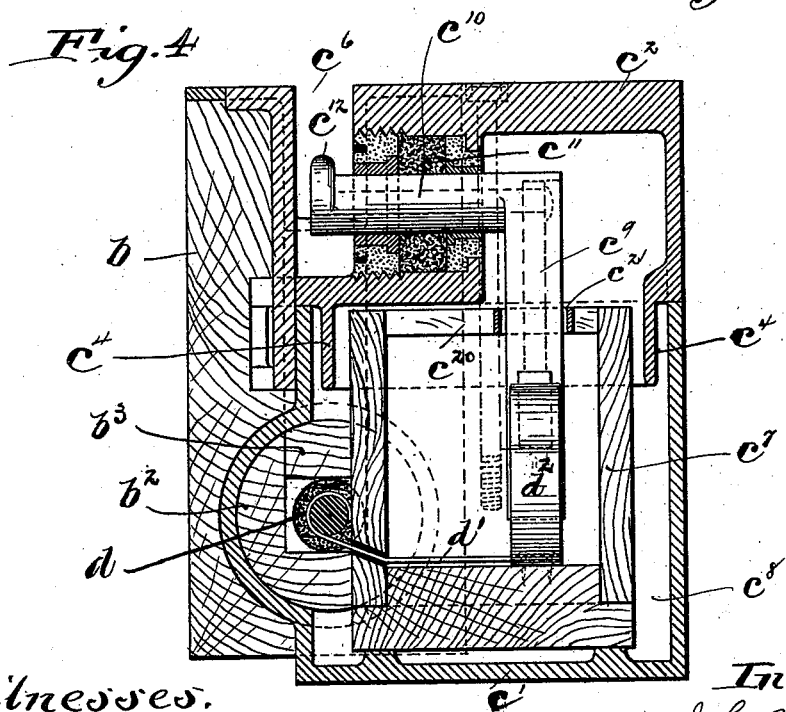
Figure 5:
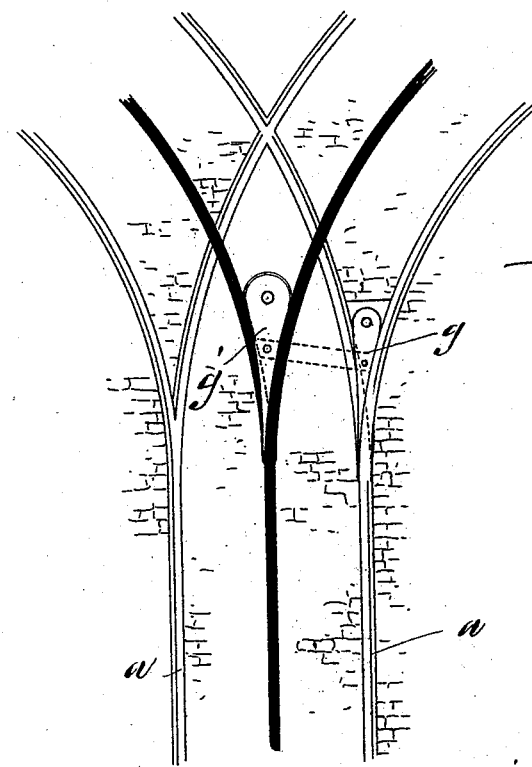
Figure 6:
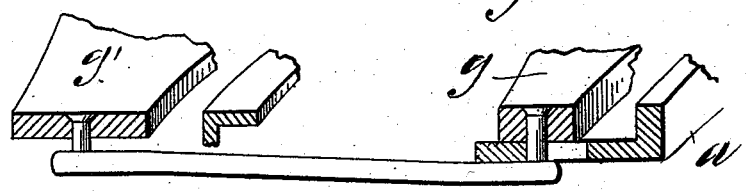
Figure 7:
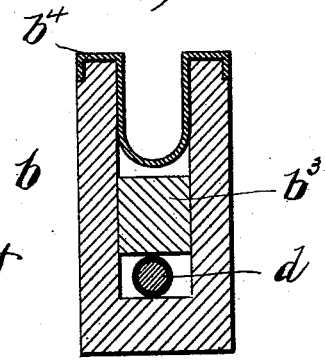
Figure 9:
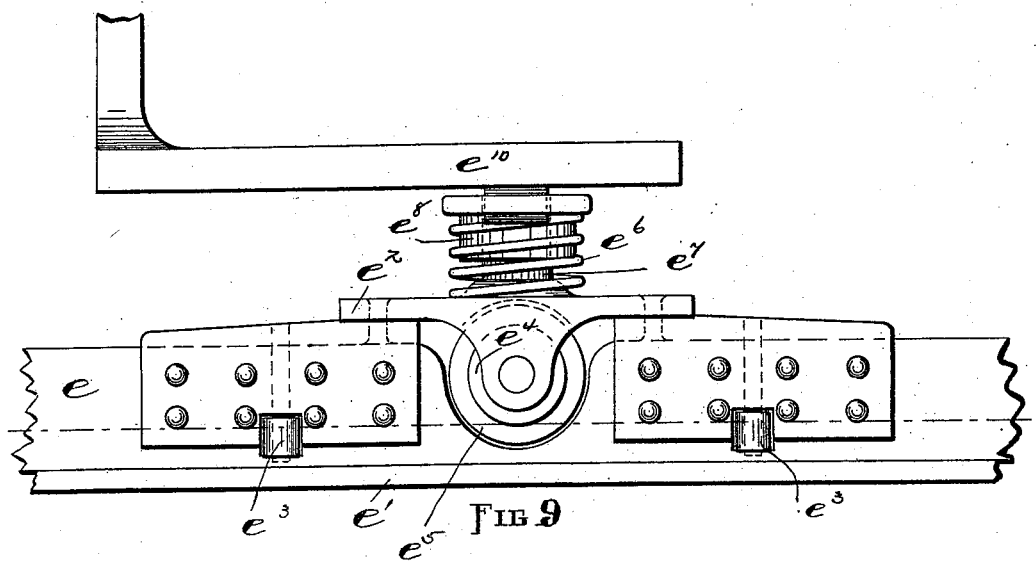
Figure 10:
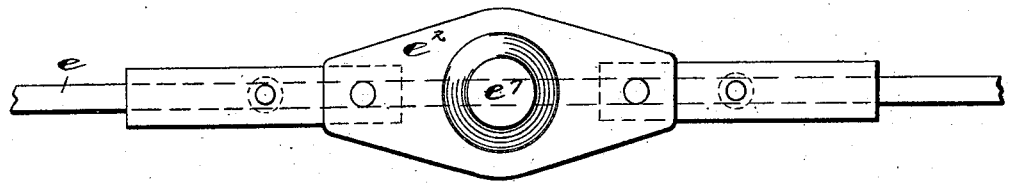
Figures 11, 12:
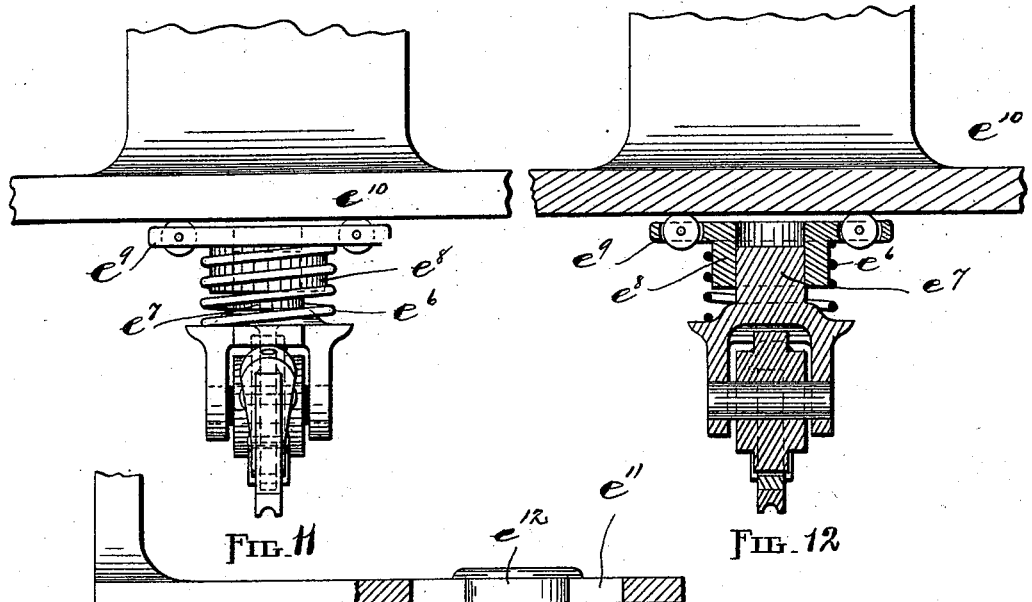
Figure 13:

Figure 1 is a side elevation of a car to which apparatus for operating the same with my improved system is supplied. Fig. 2 is a transverse sectional elevation of the lower portion of the same. Fig. 3 is a longitudinal sectional view of a portion of the conductor, and a contacting device connected thereto. Fig. 4 is a transverse section of the same. Fig. 5 is a plan view showing the method of operating the switch. Fig 6 is a perspective view partly in section of the same. Fig 7 is a transverse sectional view of the slot rail and conductor. Fig. 8 is a longitudinal sectional view of one of the contacting devices, the section being taken on a different plane from Fig. 3. Figs. 9 to 14, inclusive, are details referred to hereinafter.

Like parts are represented by similar letters of reference throughout the several views.

In carrying out my invention, I employ, in addition to the ordinary supporting rails for carrying the cars, a third rail, which I term the slot rail. This slot rail is preferably formed of a series of wooden beams joined together; the intersections of the beams or rail sections, being marked by a contacting device of peculiar construction, which forms a part of the slot rail. The slot rail contains a conductor, which is insulated from all the parts thereof, excepting that it has a connection to the contacting devices arranged between the sections of the slot rail. The slot rail is further provided with a longitudinal depression or slot in which the collector on the car is adapted to run. This collector is made of sufficient length to reach from one contacting box to the other, and is adapted to operate the contacting devices in such a manner as to bring a portion of said boxes in contact with the conductor and thus furnish a current to the collector and thus to the motor, a return current being established through the carrying rails in the usual manner.

In the drawings, $a$ represents carrying rails of the usual construction; $b$, the slot rail, and $c$, contacting boxes. The box $c$ consists essentially of two parts, $c'$ and $c^2$, the lower portion $c'$ being provided at each end with circular bosses $c^3$, having openings therein. The upper portion $c^2$ of the box $c$, has a downwardly projecting lip $c^4$ to fit in the lower portion, the respective parts being adapted to be bolted together by clamping bolts $c^5$. The upper portion $c^2$ is thus adapted to form a cover for the lower portion, said cover being further provided with a longitudinal slot $c^6$, which extends entirely through the same from side to side. This slot $c^6$ is adapted to form a continuation of the slot rail $b$, which is preferably constructed in the following manner: I take a series of wooden beams of any suitable size, preferably rectangular in cross-section, and construct in each of these beams a slot $b'$, which extends into the same for the greater portion of the depth thereof. At each end of each of these beams I form round bosses or trunnions $b^2$, the bottoms of which extend below the bottom of the slot $b'$. These trunnions or bosses $b^2$ are adapted to fit in openings formed in the circular bosses $c^3$ of the contacting box, with the slot $b'$ opposite the slot $c^6$ on the upper portion of said box. Within the slot $b'$ I place the conductor $d$, which may consist of any ordinary conductor of suitable capacity. Above the conductor $d$, I insert in the slot $b'$ a strip $b^3$, preferably of wood and of a size sufficient to fill up the slot over said conductor. At the top of each of the beams forming the slot rail $b$, I insert a U-shaped piece of channel iron $b^4$, preferably adapted to cover over the entire top of said slot rail and to extend into the slot $b'$ and form with the slot $c^6$ of the box a continuous depression. (See Fig. 7.)

Within the lower portion of each of the contacting boxes $c$, I place an auxiliary box $c^7$, preferably formed of wood; this auxiliary box being something smaller than the interior of the lower portion $c'$ of the box so as to leave a space $c^8$ around the same. From the conductor $d$ I extend a connection $d'$ to a contacting spring $d^2$, within the auxiliary box $c^7$, after which the interior of the lower casing $c'$ of the contacting box is filled with asphaltum or similar material, which will completely fill the space $c^8$ around the auxiliary box, and thus completely insulate the same and seal it against moisture. A portion of this insulating material is also preferably permitted to pass into the interior of the box and completely surround the conductor and the conducting strip $d'$.

The upper part $c^2$ of the box is provided with a swinging contact device $c^9$, having a laterally extending arm $c^{10}$, which passes through a suitable insulating and stuffing-box $c^{11}$ so as to extend into the slot $c^6$ forming a continuation of the slot rail. This arm $c^{10}$ is provided with a projection $c^{12}$ on one side, adapted, when in contact with the collector, as hereinafter more fully described, to cause the swinging contact $c^9$ to move in either direction so as contact with either arm of the U-shaped spring contact $d^2$. The upper and lower portions of the respective boxes being equipped as described, they are bolted together by the bolts $c^5$, the projecting lip $c^4$ of the cover being adapted to project down into the asphaltum and thus completely seal the parts together.

Arranged on each car and supported therefrom so as to project down into the slot rail is the collector $e$, which consists preferably of a flexible strip of wood or other suitable material, having at the bottom thereof a metallic shoe $e'$. This collector $e$ is provided at suitable intervals with carriers $e^2$, each of which is preferably provided with vertically-journaled friction rollers $e^3$, and a horizontally-journaled supporting wheel or roller $e^4$. These latter wheels $e^4$ are provided with a central peripheral flange $e^5$, adapted to fit in the groove in the slot rail while the periphery of the wheel proper rests on top of the slot rail; the friction rollers $e^3$ being set centrally in the collector $e$ so as to project on opposite sides thereof and prevent side contact between the shoe $e'$ and the side of the slot rail. The collector $e$ extends preferably throughout the entire length of the car and is supported at suitable intervals by the carriers $e^2$, said carriers being preferably provided with springs $e^6$, which tend to press the collector firmly in the slot rail by a yielding pressure. The carriers $e^2$ are loosely connected to the car so that they may yield laterally with reference thereto and permit the collector to adjust itself to any position which the same may assume in passing curves, or otherwise. This may be accomplished by having the carriers $e^2$, provided with an extended trunnion $e^7$, journaled in a suitable bearing $e^8$, in an auxiliary carriage $e^9$, which rests on a suitable supporting plate $e^{10}$, secured to some portion of the car or car frame.

One or more of the plates $e^{10}$ may be provided with a slotted opening $e^{11}$, adapted to receive a projection $e^{12}$ on the auxiliary carriage $e^9$, so as to permit a lateral movement of the collector but prevent longitudinal movement thereof. The car being thus equipped is placed on the track with the collector extending into the slot rail. As the car moves forward it comes in contact with the projection $c^{12}$ of the arm $c^{10}$ of the swinging contact device $c^9$, and thus moves the end of said contacting device so as to contact with the spring $d^2$. The shoe of the collector is thus brought into electrical connection with the conductor $d$, and receives the current therefrom, which in turn is transmitted to the motor through any suitable connection by said collector.

In order to insure a more perfect contact in the boxes and to reduce the resistance as far as possible, I preferably provide the conducting arm with an inner strip or core of copper $c^{13}$, which is contained within an outer casing $c^{14}$ of cast iron or other suitable material. This copper core is extended through the sides of the outer casing so as to form a contact with the springs $d^2$. It is further connected through the medium of a copper shaft $c^{15}$, through the arm $c^{10}$, to the projection $c^6$, which projection is formed on said shaft and is also formed of copper. A complete copper conductor is thus formed from the springs $d^2$ to the contacting portion of the shoe.

In Fig. 3 I have shown the swinging arm provided with a weight $c^{16}$, to return it to its normal position. In Fig. 8 I have shown it modified with the weight $c^{16}$ removed and springs $c^{17}$ attached to the arm to accomplish the same function. Other modifications may be employed.

It will be understood that the timbers which form the slot rail are to be placed directly on the ties which support the track rails, as shown in Fig. 2, with the top of the slot rail flush with the top of the ground.

In Figs. 5 and 6 I have shown means for directing the collector into different branches of the slot rail at points where the road branches. This I accomplish by having a switch $g$ arranged in the slot rail so that the two devices always occupy the same relative position and cause the collector to change direction the same as the car on which the collector is secured.

It will be seen that by the system above described the contacting devices are normally out of circuit, the electrical contact being made within the boxes, which are completely sealed against moisture or frost. Leakage from the conductor is thus practically prevented. The system also dispenses with a conduit, the slot rail being of exceedingly small dimensions and occupying a position in the center of the track with its top on the surface of the ground.

The auxiliary box $c^7$ is provided at the top with a cross bar $c^{20}$, having a slotted opening $c^{21}$, through which the swinging arm extends; said bar being adapted to form a guide for said arm.

It is obvious that various modifications of my invention may be employed, which will readily suggest themselves to the mind of an ordinary mechanic. I do not, therefore, limit myself to the exact constructions shown and described, but

I claim as my invention—

1. A slot rail formed of beams having a groove therein, a conductor in the bottom of said groove, and a channel iron in the top of said groove, and contacting boxes arranged between said beams, and also provided with grooves to form a continuation of the grooved slot rail, substantially as specified.

2. The combination with a sectional slot rail, of boxes arranged between the respective sections thereof, said boxes being formed in two parts adapted to be joined together, as described, to form an outer casing, an auxiliary box arranged within said outer casing, a contacting device within the auxiliary box, and a swinging arm journaled in said outer casing, said arm having a contact within said auxiliary box, and a projecting arm extending through said casing, substantially as specified.

3. A sectional slot rail consisting of sectional rails and intermediate boxes, projecting bosses or trunnions on said sections, adapted to fit in corresponding recesses or openings in said boxes, a conductor in said rail adapted to pass through said boxes, and a channel iron arranged above said conductor adapted to close the top of said groove and thus form a depression or slot, substantially as specified.

4. The combination with the slotted beams having projecting trunnions thereon, a conductor arranged within the slots of said beams, intermediate boxes having perforated bosses adapted to receive the trunnions on said beams, a channel iron arranged at the top of said beams to form a depression or slot in the top thereof, and slots in said boxes to form a continuation of the slot in said beams, laterally projecting contact devices extending from said boxes into said slot, and means, substantially as described, for bringing said contact devices into electrical connection with said conductor when the contacting devices are moved, substantially as specified.

5. A two-part box or casing, an auxiliary box within said casing, a contacting device within said auxiliary box, and a connection from said contacting device to a normally insulated conductor, a swinging arm journaled in a suitable bearing in said casing and having a projection which extends laterally into a slot formed in said casing, and a guide within said auxiliary box for guiding said arm, substantially as specified.

6. A slot rail formed of beams having a groove therein, a conductor in the bottom of said groove, a channel iron in the top of said groove, and contacting devices arranged between the beams and also provided with a groove to form a continuation of the slot rail, and a flexible collector adapted to operate said contacting devices so as to establish an electrical connection from said conductor to said collector, substantially as specified.

7. A slot rail formed in sections and consisting essentially of grooved beams joined together by intermediate boxes also grooved to form a continuation of said slot rail, contacting devices in said boxes, and a conductor in said groove connected to said contacting devices, channel iron in the top of said groove, and a flexible collector adapted to travel in said groove and operate said contacting devices, and supporting wheels having a central flange and extended peripheries adapted to rest on said channel iron to support said collector, substantially as specified.

8. The combination with a slot rail formed in sections with intermediate boxes, as described, each section consisting essentially of a grooved beam having therein an insulated conductor, and each box being grooved to form a continuation of said slot, of a connection from said conductor to contacting devices in said boxes, a laterally arranged shaft in each of said boxes having a swinging arm adapted to engage with said contacting devices, a flexible shoe adapted to travel in said slot, and having a metallic bottom thereon, a projecting arm on each of said shafts arranged within said slot and adapted to contact with the bottom of said shoe so as to operate said swinging arms and thus establish an electrical connection from the conductor to the metallic portion of said shoe, substantially as specified.

9. The combination with the slot beams and plates, of an intermediate box connected thereto, said box being formed of two parts, the upper part having a slotted opening to correspond with and form a continuation of the slot in said beams, the lower part being provided with a contacting device having an electrical connection to a conductor which extends through said slotted beams, a rotating shaft extending laterally from said box into the slotted opening therein and having a cam-shaped projection thereon, a swinging arm attached to said shaft and adapted to swing vertically in said box so as to establish an
5 electrical connection with said contacting device when said shaft is rotated, substantially as specified.

In testimony whereof I have hereunto set my hand this 1st day of December, A. D. 1893.

JOHN B. LINN.

Witnesses:
OLIVER H. MILLER,
CHAS. I. WELCH.